US012668228B2

(12) United States Patent
Tsukagoshi et al.

(10) Patent No.: US 12,668,228 B2
(45) Date of Patent: Jun. 30, 2026

(54) MOTOR CONTROL DEVICE, ELECTROMECHANICAL INTEGRATED UNIT, HYBRID SYSTEM, ELECTRIC POWER STEERING SYSTEM, AND MOTOR CONTROL METHOD

(71) Applicant: HITACHI ASTEMO, LTD., Hitachinaka (JP)

(72) Inventors: Takaya Tsukagoshi, Hitachinaka (JP); Takafumi Hara, Tokyo (JP); Katsuhiro Hoshino, Hitachinaka (JP); Shigehisa Aoyagi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 309 days.

(21) Appl. No.: 18/559,838

(22) PCT Filed: Feb. 9, 2022

(86) PCT No.: PCT/JP2022/005218
§ 371 (c)(1),
(2) Date: Nov. 9, 2023

(87) PCT Pub. No.: WO2022/244343
PCT Pub. Date: Nov. 24, 2022

(65) Prior Publication Data
US 2024/0227771 A1 Jul. 11, 2024

(30) Foreign Application Priority Data
May 21, 2021 (JP) ................................. 2021-086334

(51) Int. Cl.
B60W 20/00 (2016.01)
B60W 10/08 (2006.01)
(Continued)

(52) U.S. Cl.
CPC ............ B60W 20/00 (2013.01); B60W 10/08 (2013.01); H02P 21/22 (2016.02); H02P 21/30 (2016.02); H02P 27/08 (2013.01)

(58) Field of Classification Search
CPC .......... H02P 21/22; H02P 27/08; H02P 27/16; B60W 10/08; B60W 20/00; B60W 30/20
See application file for complete search history.

(56) References Cited

U.S. PATENT DOCUMENTS

| | | | |
|---|---|---|---|
| 2018/0245831 A1 | 8/2018 | Uemura et al. | |
| 2019/0047546 A1* | 2/2019 | Asai ...................... | B60W 10/06 |
| 2022/0247328 A1 | 8/2022 | Ajima et al. | |

FOREIGN PATENT DOCUMENTS

| | | |
|---|---|---|
| JP | S61-227649 A | 10/1986 |
| WO | WO-2017/037791 A1 | 3/2017 |
| WO | WO-2021/053974 A1 | 3/2021 |

OTHER PUBLICATIONS

International Search Report with English Translation and Written Opinion of International Patent Application No. PCT/JP2022/005218 dated Apr. 26, 2022 (8 pages).

* cited by examiner

*Primary Examiner* — Said Bouziane
(74) *Attorney, Agent, or Firm* — Foley & Lardner LLP

(57) ABSTRACT

A motor control device controls an AC motor connected to a power transformer. The transformer transforms power from DC to AC and outputs rotational driving force generated using AC power via a speed reducer. The device includes a carrier generator that generates a carrier wave, a frequency adjuster that adjusts a frequency of the carrier wave, and a gate signal generator that performs pulse width modulation on a voltage command according to a torque command using the carrier wave and generates a gate signal for controlling the transformer. The frequency adjuster (Continued)

changes a phase difference between the voltage command and the carrier wave based on the torque command and a rotational speed of the AC motor, and adjusts the frequency such that difference between a meshing frequency of the speed reducer and a harmonic component of a harmonic current according to the voltage command falls within a predetermined range.

7 Claims, 13 Drawing Sheets

(51)  Int. Cl.
    *H02P 21/22*        (2016.01)
    *H02P 21/30*        (2016.01)
    *H02P 27/08*        (2006.01)

MOTOR CONTROL DEVICE, ELECTROMECHANICAL INTEGRATED UNIT, HYBRID SYSTEM, ELECTRIC POWER STEERING SYSTEM, AND MOTOR CONTROL METHOD

TECHNICAL FIELD

The present invention relates to a motor control device, an electromechanical integrated unit, a hybrid system, an electric power steering system, and a motor control method.

BACKGROUND ART

A permanent magnet synchronous motor does not require a mechanical current rectifying mechanism such as a brush or a commutator, is easy to maintain, is small and lightweight, and has high efficiency and power factor, and thus is widely used for applications such as driving and power generation of electric vehicles. In general, a permanent magnet synchronous motor includes a stator including an armature coil and the like, and a rotor including a permanent magnet, an iron core, and the like. A DC voltage supplied from a DC power supply such as a battery is transformed into an AC voltage by an inverter, and an AC current flows through an armature coil of a permanent magnet synchronous motor using the AC voltage, thereby generating an armature magnetic flux. The permanent magnet synchronous motor is driven by magnet torque generated by attractive force and repulsive force generated between the armature magnetic flux and the magnet magnetic flux of the permanent magnet, and reluctance torque generated to minimize magnetic resistance of the armature magnetic flux passing through the rotor.

In the permanent magnet synchronous motor, electromagnetic forces due to an armature magnetic flux and a magnet magnetic flux are generated in a rotation direction (circumferential direction) of the motor and a direction (radial direction) perpendicular to a rotation axis of the motor. The aforementioned torque is obtained by integrating the electromagnetic force in the circumferential direction and includes torque fluctuation (torque pulsation) caused by the structure of the magnetic circuit of the motor. On the other hand, the electromagnetic force generated in the radial direction of the motor acts as an excitation force (electromagnetic excitation force) that deforms and vibrates the stator and the case of the motor.

In environmentally friendly vehicles using a permanent magnet synchronous motor such as electric vehicles or hybrid vehicles, a speed reducer including a plurality of gears may be attached to the motor. In this speed reducer, vibration corresponding to a meshing frequency determined by the number of teeth of the gear is generated. Therefore, depending on the rotation speed of the motor, the electromagnetic excitation force or the torque pulsation generated in the motor and the vibration generated in the speed reducer overlap each other, and large vibration or noise may be generated.

As a related technology of the present invention, a technique described in Patent Literature 1 is known. Patent Literature 1 discloses a technique of setting an output fundamental frequency of a frequency conversion device that includes a converter and an inverter and supplies AC power to an electric motor and a meshing fundamental frequency of a gear reducer that decelerates rotation of the electric motor such that the output fundamental frequency and the meshing fundamental frequency do not match each other to avoid resonance of the output fundamental frequency and the meshing fundamental frequency.

CITATION LIST

Patent Literature

Patent Literature 1: Japanese Patent Application Laid-Open No. 61-227649

SUMMARY OF INVENTION

Technical Problem

In environmentally friendly vehicles using a permanent magnet synchronous motor such as electric vehicles or hybrid vehicles, vibration and noise are problems in a wide range of rotation speeds. However, in the method disclosed in Patent Literature 1, it is not possible to effectively suppress generation of vibration and noise due to interaction between the motor and the speed reducer in the wide range of rotation speeds.

The present invention has been made in view of the above problems, and an object of the present invention is to effectively suppress vibration and noise generated in a case where a motor and a speed reducer have been combined.

Solution to Problem

A motor control device according to the present invention controls driving of an AC motor that is connected to a power transformer that performs power transform from DC power to AC power and outputs a rotational driving force generated by driving using the AC power via a speed reducer, and includes a carrier generator that generates a carrier wave, a carrier frequency adjuster that adjusts a frequency of the carrier wave, and a gate signal generator that performs pulse width modulation on a voltage command according to a torque command using the carrier wave and generates a gate signal for controlling an operation of the power transformer, wherein the carrier frequency adjuster changes a phase difference between the voltage command and the carrier wave on the basis of the torque command and a rotational speed of the AC motor, and adjusts the frequency of the carrier wave such that a difference between a meshing frequency of the speed reducer and a harmonic component of a fundamental harmonic current according to the voltage command falls within a predetermined range.

An electromechanical integrated unit according to the present invention includes the motor control device, the power transformer connected to the motor control device, the AC motor driven by the power transformer, and the speed reducer that transmits the rotational driving force of the AC motor, wherein the AC motor, the power transformer, and the speed reducer have an integrated structure.

A hybrid system according to the present invention includes the motor control device, the power transformer connected to the motor control device, the AC motor driven by the power transformer, the speed reducer that transmits the rotational driving force of the AC motor, and an engine system connected to the AC motor.

An electric power steering system according to the present invention includes the motor control device, the power transformer connected to the motor control device, the AC motor driven by the power transformer, and the speed reducer that transmits the rotational driving force of the AC motor, wherein a steering operation of a driver is assisted using the rotational driving force of the AC motor.

A motor control method according to the present invention is a method of controlling driving of an AC motor that is connected to a power transformer that performs power transform from DC power to AC power and outputs a rotational driving force generated by driving using the AC power via a speed reducer, the method including: generating a voltage command according to a torque command; changing a phase difference between the voltage command and a carrier wave on the basis of the torque command and a rotational speed of the AC motor, and adjusting a frequency of the carrier wave such that a difference between a meshing frequency of the speed reducer and a harmonic component of a fundamental harmonic current according to the voltage command falls within a predetermined range; generating the carrier wave at the adjusted frequency; and performing pulse width modulation on the voltage command using the carrier wave and generating a gate signal for controlling an operation of the power transformer.

Advantageous Effects of Invention

According to the present invention, it is possible to effectively suppress vibration and noise generated in a case where a motor and a speed reducer have been combined.

BRIEF DESCRIPTION OF DRAWINGS

FIG. 1 is an overall configuration diagram of a motor drive system including a motor control device according to an embodiment of the present invention.

FIG. 5 is a block diagram of a carrier frequency adjuster according to the first embodiment of the present invention.

DESCRIPTION OF EMBODIMENTS

First Embodiment

Figure 2:
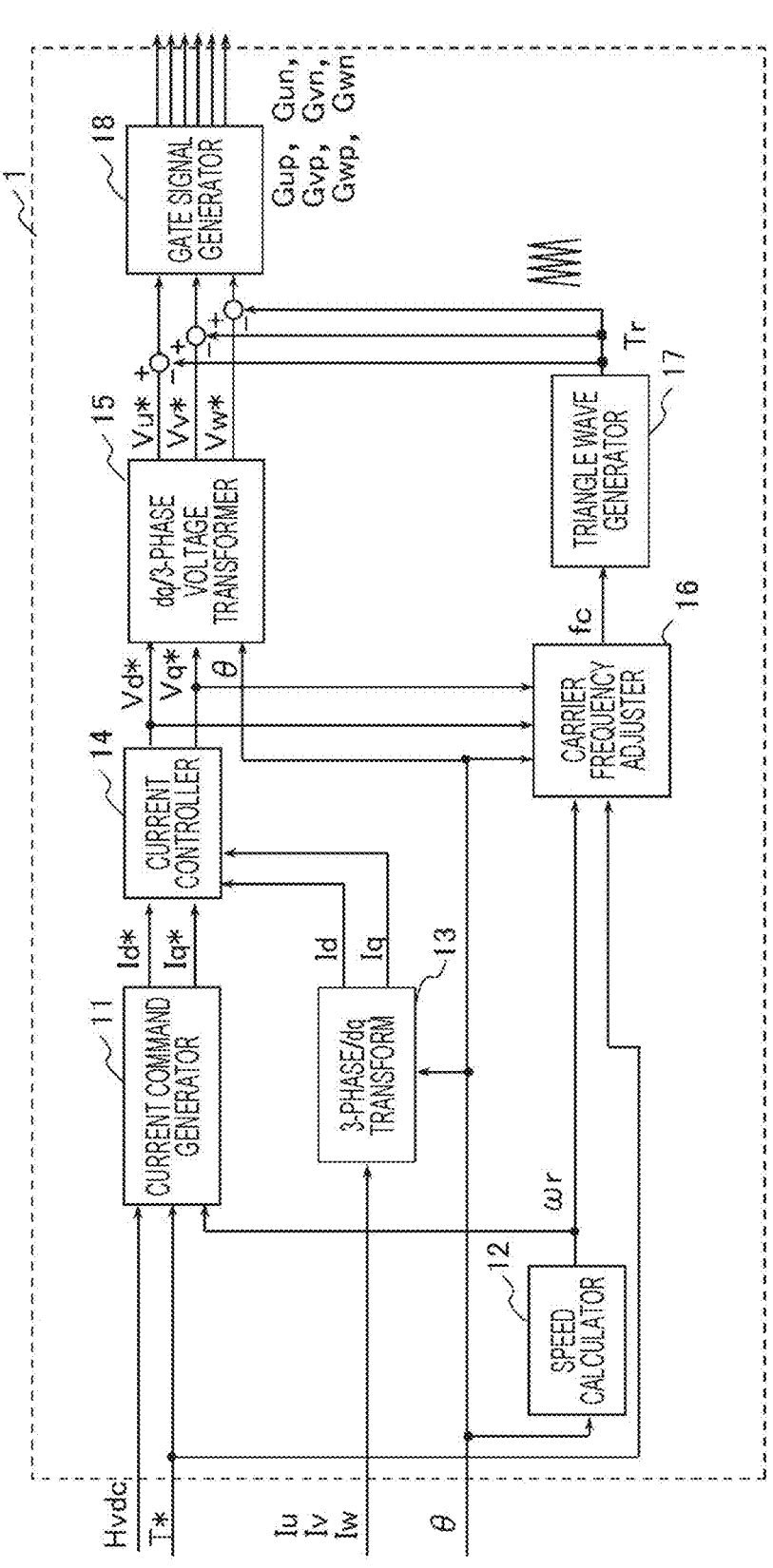
FIG. 2 is a block diagram illustrating a functional configuration of a motor control device according to a first embodiment of the present invention.

Hereinafter, a first embodiment of the present invention will be described with reference to the drawings.

Figure 1:
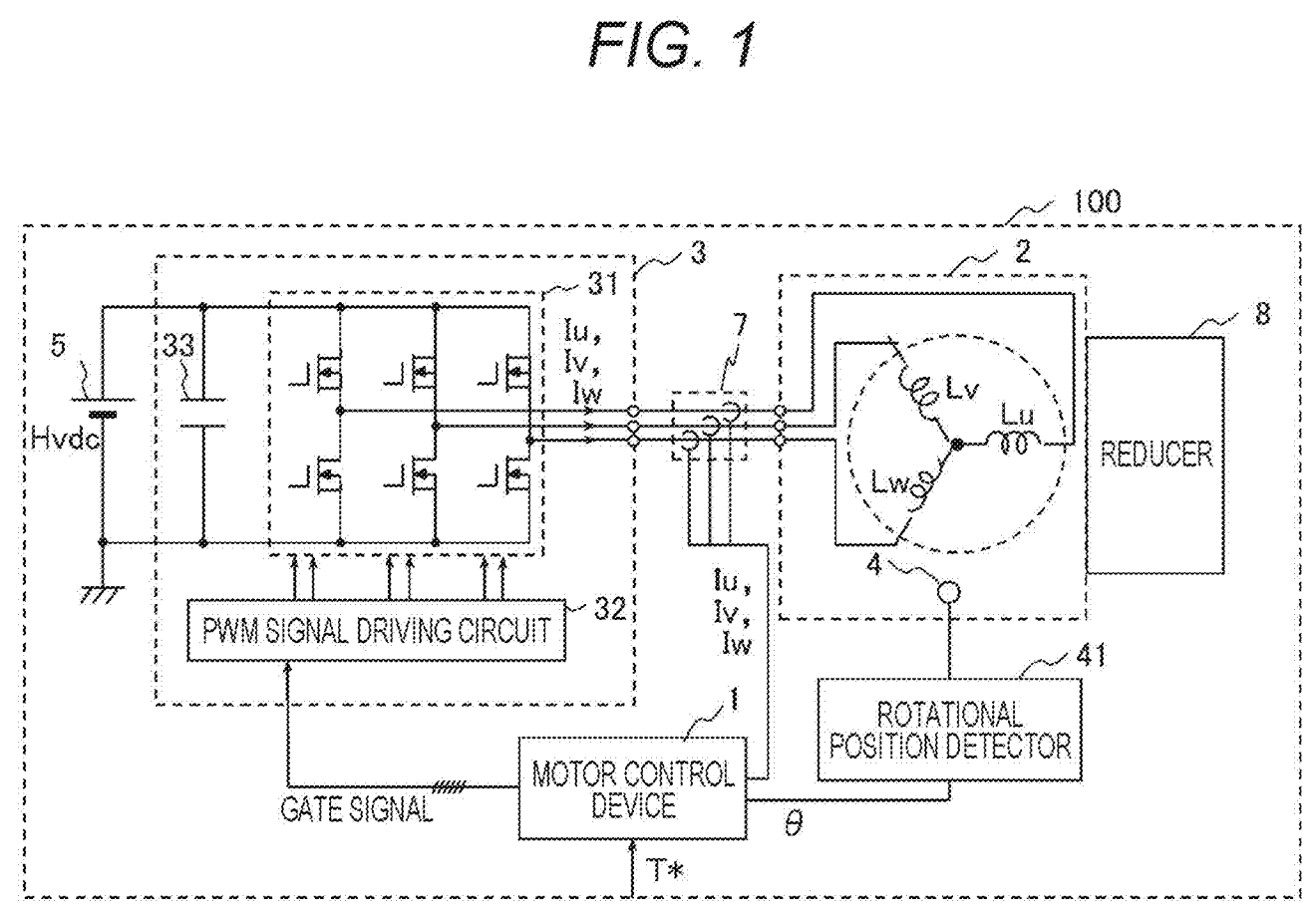

FIG. 1 is an overall configuration diagram of a motor drive system including a motor control device according to an embodiment of the present invention. In FIG. 1, the motor drive system 100 includes a motor control device 1, a motor 2, an inverter 3, a high-voltage battery 5, a current detection unit 7, a speed reducer 8, and a rotational position detector 41.

The rotational position θ of the motor 2 is input from the rotational position detector 41 to the motor control device 1. In addition, Iu, Iv, and Iw representing three-phase alternating currents flowing through the motor 2 are input from the current detection unit 7, and a torque command T* is input from a host control device that is not illustrated. The motor control device 1 generates a gate signal for controlling driving of the motor 2 on the basis of the input information and outputs the gate signal to the inverter 3. As a result, the operation of the inverter 3 is controlled, and driving of the motor 2 is controlled. Details of the motor control device 1 will be described later.

The inverter 3 includes an inverter circuit 31, a PWM signal driving circuit 32, and a smoothing capacitor 33. The PWM signal driving circuit 32 generates a PWM signal for controlling each switching element included in the inverter circuit 31 on the basis of the gate signal input from the motor control device 1 and outputs the PWM signal to the inverter circuit 31. The inverter circuit 31 includes switching elements corresponding to each of an upper arm and a lower arm of a U phase, a V phase, and a W phase. By controlling each of these switching elements according to the PWM signal input from the PWM signal driving circuit 32, DC power supplied from the high-voltage battery 5 is transformed into AC power and output to the motor 2. The smoothing capacitor 33 smooths the DC power supplied from the high-voltage battery 5 to the inverter circuit 31.

The high-voltage battery 5 is a DC voltage source of the motor drive system 100 and outputs a power supply voltage Hvdc to the inverter 3. The power supply voltage Hvdc of the high-voltage battery 5 is transformed into a pulsed three-phase AC voltage having a variable voltage and a variable frequency by the inverter circuit 31 and the PWM signal driving circuit 32 of the inverter 3, and is applied to the motor 2 as a line voltage. As a result, AC power is supplied from the inverter 3 to the motor 2 on the basis of the DC power of the high-voltage battery 5. The power supply voltage Hvdc of the high-voltage battery 5 varies depending on the state of charge thereof.

The motor 2 is a three-phase motor rotationally driven by AC power supplied from the inverter 3 and includes a stator and a rotor. Although an example in which a permanent magnet synchronous motor is used as the motor 2 is described in the present embodiment, another type of motor 2 such as an induction motor or a synchronous reluctance motor may be used. When the AC power input from the inverter 3 is applied to three-phase coils Lu, Lv, and Lw provided in the stator, the three-phase alternating currents Iu, Iv, and Iw are conducted in the motor 2, and a magnetic flux is generated in each coil. When attractive force and repulsive force are generated between the magnetic flux of each coil and the magnet magnetic flux of the permanent magnet disposed in the rotor, a torque is generated in the rotor, and the motor 2 is rotationally driven.

A speed reducer 8 formed by combining a plurality of gears is attached to a rotation shaft of the motor 2. The torque generated in the rotor of the motor 2 is transmitted from a rotation shaft fixed to the rotor to the outside of the motor drive system 100 via the speed reducer 8.

A rotational position sensor 4 for detecting the rotational position θ of the rotor is attached to the motor 2. The rotational position detector 41 calculates the rotational position θ from an input signal of the rotational position sensor 4. The calculation result of the rotational position θ obtained by the rotational position detector 41 is input to the motor control device 1, and is used in phase control of the AC power performed by the motor control device 1 generating a pulse-shaped gate signal in accordance with the phase of an induced voltage of the motor 2.

Here, although a resolver including an iron core and a winding is more suitable as the rotational position sensor 4, a sensor using a magnetoresistive element such as a GMR sensor or a Hall element may be used as the rotational position sensor 4. Any sensor can be used as the rotational position sensor 4 as long as the magnetic pole position of the rotor can be measured. Further, the rotational position detector 41 may estimate the rotational position θ using three-phase alternating currents Iu, Iv, and Iw flowing through the motor 2 and three-phase AC voltages Vu, Vv, and Vw applied from the inverter 3 to the motor 2 without using the input signal from the rotational position sensor 4.

The current detection unit 7 is disposed on a current path between the inverter 3 and the motor 2. The current detection unit 7 detects three-phase alternating currents Iu, Iv, and Iw (U-phase alternating current Iu, V-phase alternating current Iv, and W-phase alternating current Iw) that energize the motor 2. The current detection unit 7 is configured using, for example, a Hall current sensor or the like. The result of detection of the three-phase alternating currents Iu, Iv, and Iw by the current detection unit 7 is input to the motor control device 1 and used for generation of a gate signal performed by the motor control device 1. Although FIG. 1 illustrates an example in which the current detection unit 7 includes three current detectors, two current detectors may be provided, and the alternating current of the remaining one phase may be calculated from the fact that the sum of the three-phase alternating currents Iu, Iv, and Iw is zero. The pulsed direct current flowing from the high-voltage battery 5 into the inverter 3 may be detected by a shunt resistor or the like inserted between the smoothing capacitor 33 and the inverter 3, and the three-phase alternating current Iu, Iv, and Iw may be obtained on the basis of the direct current and the three-phase AC voltages Vu, Vv, and Vw applied from the inverter 3 to the motor 2.

Next, details of the motor control device 1 will be described. FIG. 2 is a block diagram illustrating a functional configuration of the motor control device 1 according to the first embodiment of the present invention.

As illustrated in FIG. 2, the motor control device 1 includes functional blocks of a current command generator 11, a speed calculator 12, a three-phase/dq transformer 13, a current controller 14, a dq/three-phase voltage transformer 15, a carrier frequency adjuster 16, a triangular wave generator 17, and a gate signal generator 18. The motor control device 1 includes, for example, a microcomputer, and can realize these functional blocks by executing a predetermined program in the microcomputer. Alternatively, some or all of these functional blocks may be realized using a hardware circuit such as a logic IC or an FPGA.

The current command generator 11 calculates a d-axis current command Id* and a q-axis current command Iq* on the basis of the input torque command T* and the power supply voltage Hvdc. Here, for example, the d-axis current command Id* and the q-axis current command Iq* according to the torque command T* are obtained using a preset current command map, a mathematical expression representing the relationship between a d-axis current Id and a q-axis current Iq and a motor torque, or the like.

The speed calculator 12 calculates a motor rotational speed or representing the rotational speed of the motor 2 from temporal change in the rotational position θ. The motor rotational speed or may be a value represented by either an angular velocity (rad/s) or the rotation speed (rpm). In addition, these values may be mutually converted and used.

The three-phase/dq transformer 13 performs dq transform based on the rotational position θ obtained by the rotational position detector 41 on the three-phase alternating currents Iu, Iv, and Iw detected by the current detection unit 7, and calculates a d-axis current value Id and a q-axis current value Iq.

The current controller 14 calculates a d-axis voltage command Vd* and a q-axis voltage command Vq* according to the torque command T* on the basis of deviations between the d-axis current command Id* and the q-axis current command Iq* output from the current command generator 11 and the d-axis current value Id and the q-axis current value Iq output from the three-phase/dq transformer 13 such that these values match each other. Here, the d-axis voltage command Vd* according to the deviation between the d-axis current command Id* and the d-axis current value Id and the q-axis voltage command Vq* according to the deviation between the q-axis current command Iq* and the q-axis current value Iq are obtained, for example, using a control method such as PI control.

The dq/three-phase voltage transformer 15 performs three-phase transform based on the rotational position θ obtained by the rotational position detector 41 on the d-axis voltage command Vd* and the q-axis voltage command Vq* calculated by the current controller 14, and calculates three-phase voltage commands Vu*, Vv*, and Vw* (U-phase voltage command value Vu*, V-phase voltage command value Vv*, and W-phase voltage command value Vw*). As a result, the three-phase voltage commands Vu*, Vv*, and Vw* according to the torque command T* are generated.

The carrier frequency adjuster 16 calculates a carrier frequency fc representing the frequency of a carrier wave used to generate a gate signal on the basis of the d-axis voltage command Vd* and the q-axis voltage command Vq* generated by the current command generator 11, the rotational position θ obtained by the rotational position detector 41, the rotational speed or obtained by the speed calculator 12, and the torque command T*. Details of a method of calculating the carrier frequency fc by the carrier frequency adjuster 16 will be described later.

Triangular wave generator 17 generates a triangular wave signal (carrier signal) Tr for each of the three-phase voltage commands Vu*, Vv*, and Vw* on the basis of the carrier frequency fc calculated by carrier frequency adjuster 16.

The gate signal generator 18 performs pulse width modulation on each of the three-phase voltage commands Vu*, Vv*, and Vw* output from the dq/three-phase voltage transformer 15 using the triangular wave signal Tr output from the triangular wave generator 17, and generates a gate signal for controlling the operation of the inverter 3. Specifically, a pulsed voltage is generated for each of the U phase, the V phase, and the W phase on the basis of results of comparison between the three-phase voltage commands Vu*, Vv*, and Vw* output from the dq/three-phase voltage transformer 15 and the triangular wave signal Tr output from the triangular wave generator 17. Then, a pulsed gate signal for the switching element of each phase of the inverter 3 is generated on the basis of the generated pulsed voltage. At this time, gate signals Gup, Gvp, and Gwp of the upper arms of the respective phases are logically inverted to generate gate signals Gun, Gvn, and Gwn of the lower arms. The gate signal generated by the gate signal generator 18 is output from the motor control device 1 to the PWM signal driving circuit 32 of the inverter 3 and is converted into a PWM signal by the PWM signal driving circuit 32. As a result, each switching element of the inverter circuit 31 is controlled to be turned on/off, and the output voltage of the inverter 3 is adjusted.

Next, an operation of the carrier frequency adjuster 16 in the motor control device 1 will be described. As described above, the carrier frequency adjuster 16 calculates the carrier frequency fc on the basis of the d-axis voltage command Vd* and the q-axis voltage command Vq*, the rotational position θ, the rotational speed ωr, and the torque command T*. By sequentially controlling the frequency of the triangular wave signal Tr generated by the triangular wave generator 17 according to the carrier frequency fc, the voltage waveforms of the three-phase voltage commands Vu*, Vv*, and Vw* according to the torque command T* are adjusted such that the cycle and the phase of the triangular wave signal Tr, which is a carrier wave, have a desired relationship. The desired relationship here indicates a relationship in which the electromagnetic excitation force or torque pulsation generated in the motor 2 according to a harmonic current caused by the switching operation of the inverter 3 according to a PWM signal and vibration generated by meshing of the gears in the speed reducer 8 have the same cycle and opposite phases. As a result, vibration and noise generated in the motor drive system 100 configured by combining the motor 2 and the speed reducer 8 are suppressed.

Figure 3:
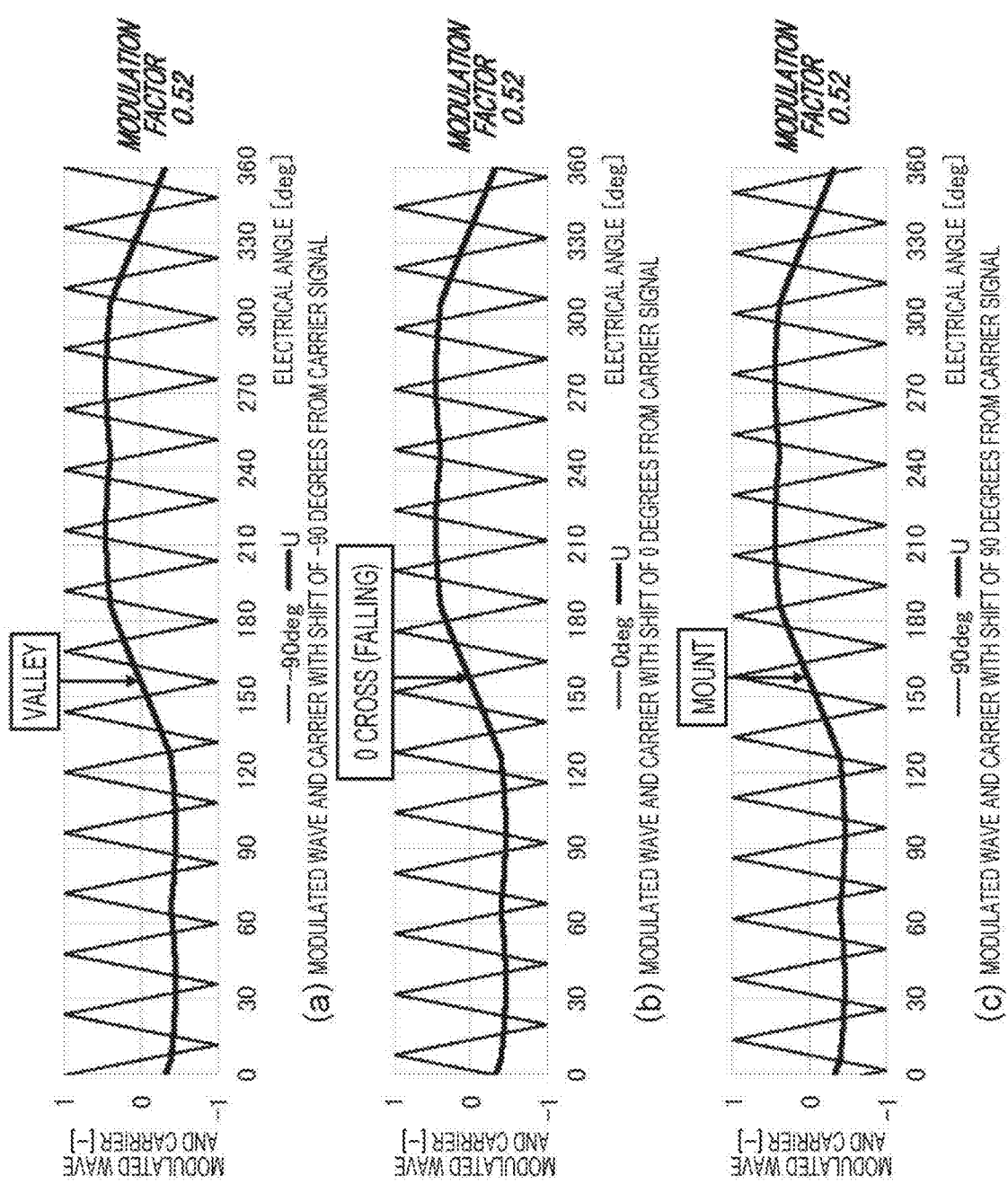
FIG. 3 is a diagram illustrating a relationship between voltage waveforms in a case where a phase difference between a modulated wave and a carrier wave has been changed.

A basic idea of a method of suppressing vibration of the speed reducer 8 in the present embodiment will be described below with reference to FIGS. 3 and 4. FIG. 3 is a diagram illustrating a relationship between voltage waveforms in a case where a phase difference (hereinafter, referred to as "modulated wave/carrier wave phase difference") between a U-phase voltage command Vu* as a modulated wave and a triangular wave signal Tr as a carrier wave has been changed. FIG. 3(*a*) illustrates the voltage waveforms of a carrier wave and a modulated wave in a case where the modulated wave/carrier wave phase difference is −90 deg, FIG. 3(*b*) illustrates the voltage waveforms of the carrier wave and the modulated wave in a case where the modulated wave/carrier wave phase difference is 0 deg, and FIG. 3(*c*) illustrates the voltage waveforms of the carrier wave and the modulated wave in a case where the modulated wave/carrier wave phase difference is 90 deg. The triangular wave which is a carrier wave becomes a valley at the time of zero cross rising of the modulated wave in the case of FIG. 3(*a*), the triangular wave becomes a zero cross falling at the time of zero cross rising of the modulated wave in the case of FIG. 3(*b*), and the triangular wave becomes a mount at the time of zero cross rising of the modulated wave in the case of FIG. 3(*c*). As described above, by changing the modulated wave/carrier wave phase difference, it is possible to freely change the phase of a harmonic component other than the fundamental wave component while keeping the amplitude of a U-phase AC voltage Vu obtained by PWM control constant as described below.

Although the frequency ratio between the modulated wave and the carrier wave is set to 15 in FIGS. 3(*a*) to 3(*c*) for convenience of description, the present invention is not limited thereto. Although FIGS. 3(*a*) to 3(*c*) illustrate the U-phase voltage command Vu* as an example of the modulated wave, it is also possible to freely change the phase of a harmonic component other than the fundamental wave component by setting the modulated wave/carrier wave phase difference similarly to FIG. 3 for voltage commands of other phases, that is, the V-phase voltage command Vv* and the W-phase voltage command Vw*.

Figure 4:
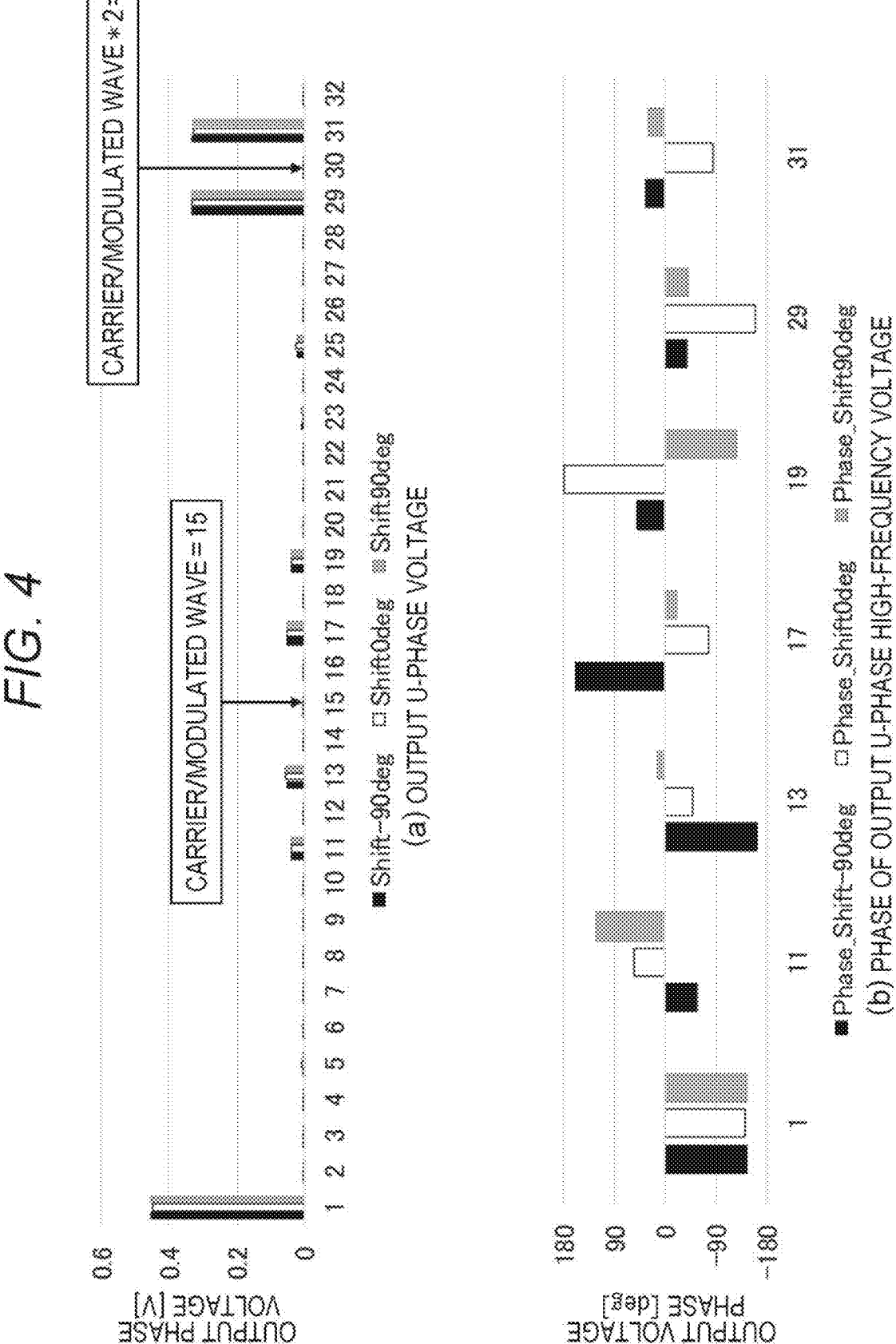
FIG. 4 is a diagram illustrating harmonic components of a U-phase AC voltage in a case where a phase difference between a modulated wave and a carrier wave has been changed.

FIG. 4 is a diagram illustrating harmonic components of the U-phase AC voltage Vu output from the inverter 3 to the motor 2 in a case where the phase difference between the U-phase voltage command Vu* as a modulated wave and the triangular wave signal Tr as a carrier wave has been changed. FIG. 4(*a*) illustrates the modulated wave/carrier wave phase difference illustrated in FIGS. 3(*a*) to 3(*c*), that is, the amplitude of each harmonic component of the U-phase AC voltage Vu at each phase difference of −90 deg, 0 deg, and 90 deg, and FIG. 4(*b*) illustrates the phase of each harmonic component of the U-phase AC voltage Vu at each phase difference. FIGS. 4(*a*) and 4(*b*) illustrate the amplitude and the phase of the fundamental wave component as a primary component of the U-phase AC voltage Vu. Further, FIG. 4(*b*) illustrates phases of the eleventh, thirteenth, seventeenth, nineteenth, twenty-ninth, and thirty-first harmonic components having relatively large amplitudes in FIG. 4(*a*) in a case where the phase of the fundamental wave component is −135 deg.

From FIG. 4(*a*), it is confirmed that the amplitude of each order component including the first order (fundamental wave) does not change in the U-phase AC voltage Vu output from the inverter 3 even if the modulated wave/carrier wave phase difference is changed. That is, it can be ascertained that the torque output value of the motor 2 does not change even if the modulated wave/carrier wave phase difference is changed. On the other hand, from FIG. 4(*b*), it can be ascertained that the phase of each harmonic component other than the first (fundamental) component of the U-phase AC voltage Vu changes according to the modulated wave/ carrier wave phase difference. That is, changing the modulated wave/carrier wave phase difference can be said to be equivalent to changing the phase of a harmonic component other than the fundamental wave component of the U-phase AC voltage Vu.

Although FIGS. 4(*a*) and 4(*b*) illustrate frequency analysis results of the U-phase AC voltage Vu among the three-phase AC voltages output from the inverter 3, the same frequency analysis results as those in FIGS. 4(*a*) and 4(*b*) are obtained for the AC voltages of the other phases, that is, the V-phase AC voltage Vv and the W-phase AC voltage Vw. Therefore, by changing the modulated wave/carrier wave phase difference, it is possible to arbitrarily change the phase of a harmonic component other than the fundamental wave component of the three-phase AC voltage output from the inverter 3.

As described above, by changing the modulated wave/ carrier wave phase difference, it is possible to change the phase of each harmonic component of the three-phase AC voltage output from the inverter 3 while maintaining the torque output value of the motor 2. Therefore, the electromagnetic excitation force or torque pulsation generated in the motor 2 by the harmonic current caused by the switching operation of the inverter 3 according to the PWM signal and vibration generated by meshing of the gears in the speed reducer 8 are set to have the same cycle, and then the value of the modulated wave/carrier wave phase difference is set such that the electromagnetic excitation force or torque pulsation and the vibration have phases opposite each other, whereby the above-described desired relationship can be satisfied. As a result, it can be ascertained that vibration generated in the speed reducer 8 can be offset by the electromagnetic excitation force and torque pulsation caused by a carrier wave used in pulse width modulation, and vibration and noise generated in the motor drive system 100 can be reduced.

Figure 5:
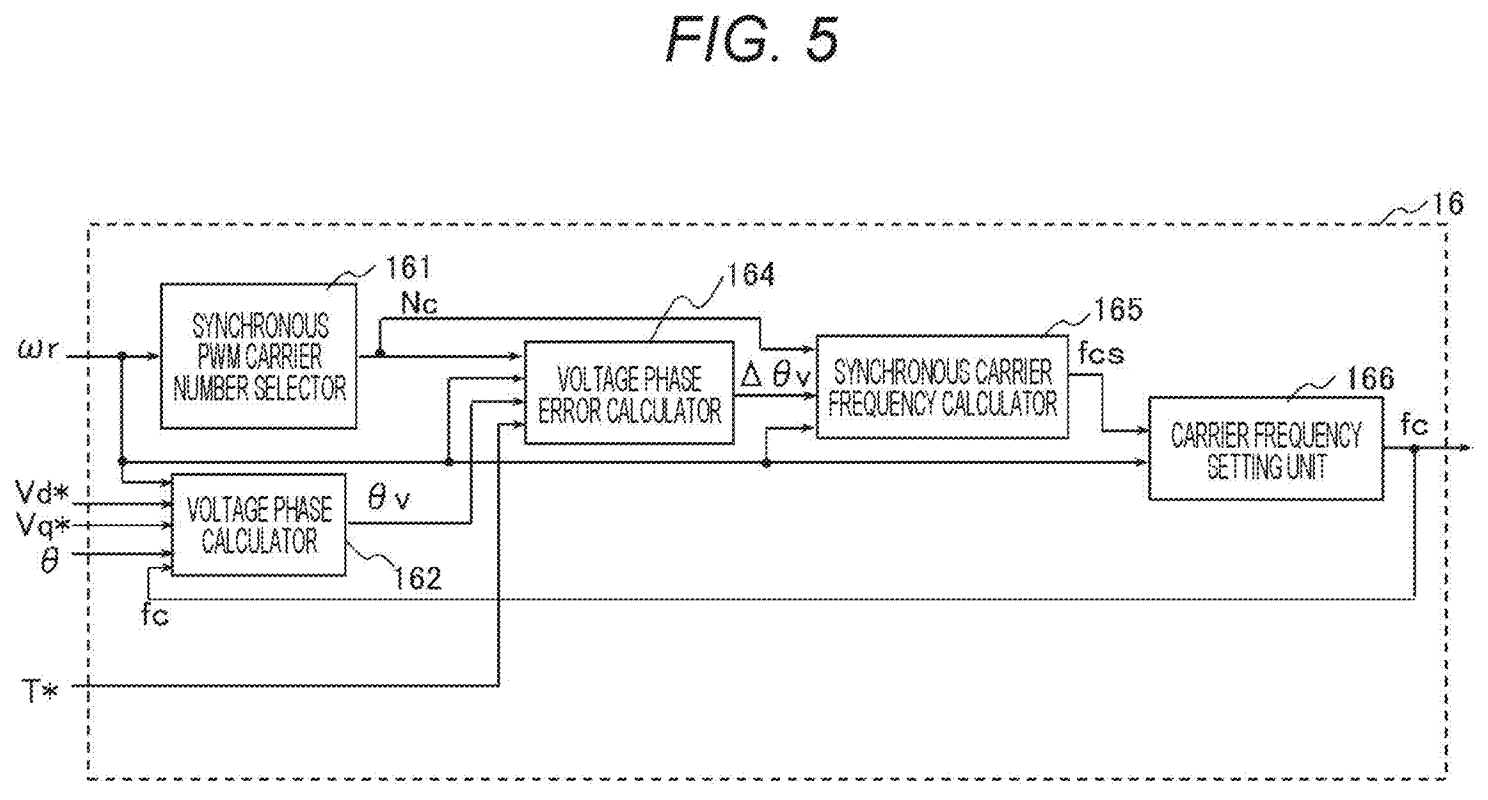

FIG. 5 is a block diagram of the carrier frequency adjuster 16 according to the first embodiment of the present invention. The carrier frequency adjuster 16 includes a synchronous PWM carrier number selector 161, a voltage phase calculator 162, a voltage phase error calculator 164, a synchronous carrier frequency calculator 165, and a carrier frequency setting unit 166.

The synchronous PWM carrier number selector 161 selects the number of carrier waves for one cycle of a voltage waveform in synchronous PWM control, that is, a synchronous PWM carrier number Nc representing the magnification of the carrier frequency fc with respect to the frequencies of the three-phase voltage commands Vu*, Vv*, and Vw*. For example, the synchronous PWM carrier number selector 161 selects the synchronous PWM carrier number Nc such that the values of Nc±3 and Nc×2 match the order of meshing pulsation occurring in the speed reducer 8.

The order of pulsation (sideband component) of a harmonic current due to pulse width modulation is expressed as Nc±2, Nc±4, and Nc×2±1 using the synchronous PWM carrier number Nc. The orders of the electromagnetic excitation force and torque pulsation generated in the motor 2 due to these sideband components are Nc±3 and Nc×2. On the other hand, the speed reducer 8 transmits the rotational driving force of the motor 2 by a reduction ratio corresponding to a tooth number ratio between the plurality of gears by the plurality of gears meshing with each other and rotating. At this time, pulsation due to meshing of the respective gears occurs in the output of the speed reducer 8, causing vibration in the speed reducer 8.

The frequency (meshing frequency) of pulsation due to meshing in the speed reducer 8 is proportional to the rotational speed or of the motor 2. Further, the order of the meshing frequency based on the frequency of the fundamental harmonic current of the motor 2 is determined according to the tooth number ratio of the speed reducer 8. Therefore, in order to suppress vibration of the speed reducer 8, it is preferable to adjust the triangular wave signal Tr which is a carrier wave such that the above-described desired relationship is satisfied by setting the synchronous PWM carrier number Nc such that the values of Nc±3 and Nc×2 match the order of the meshing frequency as described above. As a result, it can be ascertained that vibration generated in the speed reducer 8 can be offset by the electromagnetic excitation force and torque pulsation caused by a carrier wave used in pulse width modulation, and vibration and noise generated in the motor drive system 100 can be suppressed.

Figure 6:
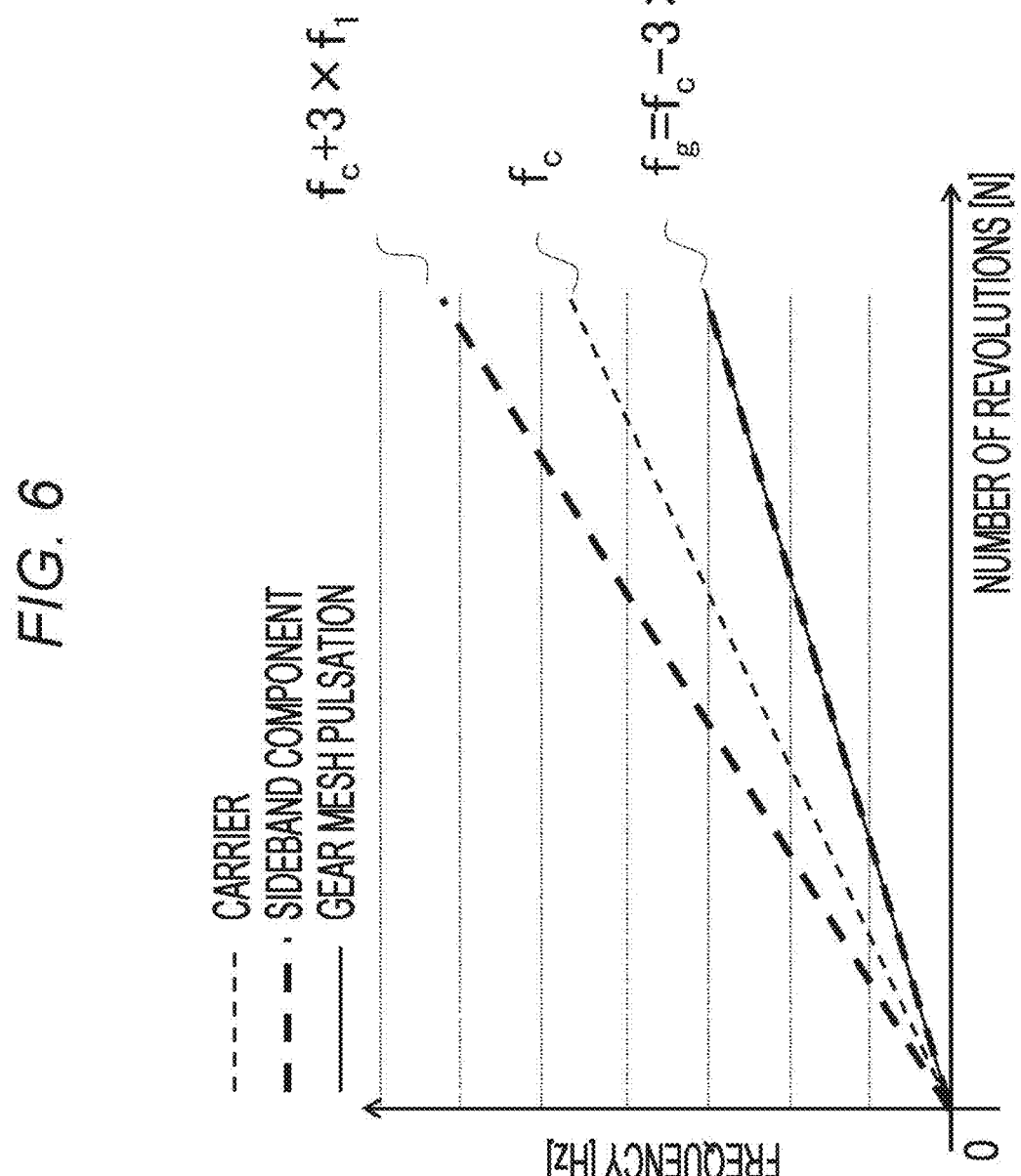
FIG. 6 is a diagram illustrating an example of a relationship between a rotation speed of a motor and a vibration frequency of the motor due to a carrier frequency, a meshing frequency of a speed reducer, and a sideband component.

FIG. 6 is a diagram illustrating an example of a relationship between the rotation speed of the motor 2 and the frequency of vibration (electromagnetic excitation force and torque pulsation) of the motor 2 due to the carrier frequency fc, the meshing frequency fg of the speed reducer 8, and a sideband component of a fundamental harmonic current. If the frequency of the fundamental harmonic current is set to f1, the frequency of vibration due to the sideband component is expressed by fc±3×f1. In synchronous PWM control, both the carrier frequency fc and the frequency f1 of the fundamental harmonic current change in proportion to the rotation speed of the motor 2. Therefore, as illustrated in FIG. 6, the frequency fc±3×f1 of the vibration due to the sideband component also changes in proportion to the rotation speed of the motor 2. The meshing frequency fg also changes in proportion to the rotation speed or of the motor 2 as described above.

Here, for example, if the synchronous PWM carrier number Nc is set such that the value of Nc−3 matches the order of the meshing frequency fg and the carrier frequency fc is adjusted accordingly, fg=fc−3×f1 is obtained as illustrated in FIG. 6. In this way, when the frequency of the vibration due to the sideband component is matched with the meshing frequency fg and then these frequencies are set to have phases opposite to each other, vibration of the speed reducer 8 caused by meshing of the gears is offset by vibration of the motor 2 due to the sideband component. Therefore, vibration of the speed reducer 8 can be suppressed. Even if the value of Nc−3 does not completely match the order of the meshing frequency fg, if the difference is within a predetermined range, vibration of the speed reducer 8 can be offset by the electromagnetic excitation force or torque pulsation of the motor 2 due to the sideband component, and thus can be suppressed.

Based on the above, the synchronous PWM carrier number selector 161 selects the value of the synchronous PWM carrier number Nc. At this time, the value of the synchronous PWM carrier number Nc to be selected may be changed according to the rotational speed ωr.

In general, in the speed reducer 8, the order of the meshing frequency is set while avoiding these orders (multiples of 6) such that resonance with the electromagnetic excitation force or torque pulsation due to the fundamental harmonic current of the motor 2 does not occur. For example, an arbitrary even or odd number, a number including a decimal point value, or the like may be set as the order of the meshing frequency. As described above, in order to offset vibration of the speed reducer 8 by the electromagnetic excitation force or torque pulsation of the motor 2 due to the sideband component, it is necessary to set the synchronous PWM carrier number Nc in accordance with the order of the meshing frequency.

For example, in a case where the order of the meshing frequency is an odd number or corresponds to a number including a decimal point value, the value of the synchronous PWM carrier number Nc set in accordance with the order needs to be a value obtained by dividing the order of the meshing frequency by the number of pole pairs and thus is not an integer but include a decimal point value (0.5, 0.25, or the like). Specifically, for example, values such as Nc=3.25 and Nc=9.25 can be selected as the value of the synchronous PWM carrier number Nc in the synchronous PWM carrier number selector 161.

The voltage phase calculator 162 calculates a voltage phase θv according to the following Formulas (1) to (4) on the basis of the d-axis voltage command Vd*, the q-axis voltage command Vq*, the rotational position θ, the rotational speed or, and the carrier frequency fc. The voltage phase θv represents the phases of the three-phase voltage commands Vu*, Vv*, and Vw* which are voltage commands for the inverter 3.

$$\theta v = \theta + \phi v + \phi dqv + 0.5 \ \pi \tag{1}$$

$$\phi v = \omega r \cdot 1.5 \ Tc \tag{2}$$

$$Tc = 1/fc \tag{3}$$

$$\phi dqv = \operatorname{atan} \left( Vq/Vd \right) \tag{4}$$

Here, $\phi v$ represents a calculation delay compensation value of the voltage phase, Tc represents a carrier cycle, and $\phi dqv$ represents a voltage phase from the d-axis. The calculation delay compensation value $\phi v$ is a value for compensating for occurrence of a calculation delay corresponding to 1.5 control cycles during a period from when the rotational position detector 41 acquires the rotational position $\theta$ to when the motor control device 1 outputs a gate signal to the inverter 3. In the present embodiment, $0.5\pi$ is added in the fourth term on the right side of Formula (1). Since the voltage phase calculated in the first to third terms on the right side of Formula (1) is a cos wave, this is a calculation for performing viewpoint transformation of this into a sin wave.

The voltage phase error calculator 164 calculates a voltage phase error $\Delta\theta v$ on the basis of the synchronous PWM carrier number Nc selected by the synchronous PWM carrier number selector 161, the voltage phase $\theta v$ calculated by the voltage phase calculator 162, the rotational speed $\omega r$, and the torque command T*. The voltage phase error $\Delta\theta v$ represents a phase difference between the three-phase voltage commands Vu*, Vv*, and Vw*, which are voltage commands for the inverter 3, and the triangular wave signal Tr, which is a carrier wave used for pulse width modulation. The voltage phase error calculator 164 calculates the voltage phase error $\Delta\theta v$ every predetermined calculation cycle, and thus the carrier frequency adjuster 16 can adjust the frequency of the triangular wave signal Tr such that the phase difference between a voltage command for the inverter 3 and the carrier wave used for pulse width modulation is changed. Details of a method of calculating the voltage phase error $\Delta\theta v$ by the voltage phase error calculator 164 will be described later.

The synchronous carrier frequency calculator 165 calculates a synchronous carrier frequency fcs on the basis of the voltage phase error $\Delta\theta v$ calculated by the voltage phase error calculator 164, the rotational speed $\omega r$, and the synchronous PWM carrier number Nc selected by the synchronous PWM carrier number selector 161 according to the following Formula (5).

$$fcs = \omega r \cdot Nc \cdot (1 + \Delta\theta v \cdot K)/(2\pi) \tag{5}$$

The synchronous carrier frequency calculator 165 can calculate the synchronous carrier frequency fcs based on Formula (5), for example, according to phase locked loop (PLL) control. In Formula (5), the gain K may be a constant value or may be variable depending on conditions.

The carrier frequency setting unit 166 selects either the synchronous carrier frequency fcs calculated by the synchronous carrier frequency calculator 165 or the asynchronous carrier frequency fcns on the basis of the rotational speed $\omega r$, and outputs the selected frequency as the carrier frequency fc. The asynchronous carrier frequency fcns is a constant value preset in the carrier frequency setting unit 166. A plurality of asynchronous carrier frequencies fcns may be prepared in advance, and one thereof may be selected according to the rotational speed $\omega r$. For example, the carrier frequency setting unit 166 can select and output the asynchronous carrier frequency fcns as the carrier frequency fc such that the larger the value of the rotational speed $\omega r$, the larger the value of the asynchronous carrier frequency fcns.

Next, a method of calculating the voltage phase error 40v in the voltage phase error calculator 164 in the carrier frequency adjuster 16 will be described in detail.

Figure 7:
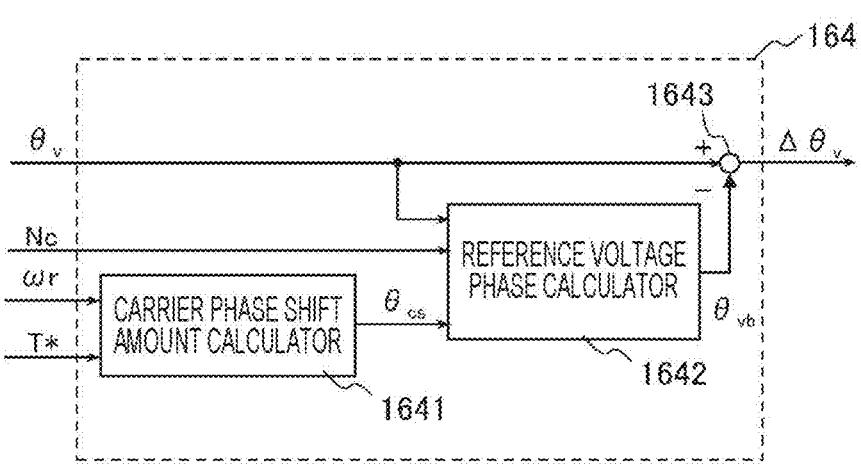
FIG. 7 is a block diagram of a voltage phase error calculator according to the first embodiment of the present invention.

FIG. 7 is a block diagram of the voltage phase error calculator 164 according to the first embodiment of the present invention. The voltage phase error calculator 164 includes a carrier phase shift amount calculator 1641, a reference voltage phase calculator 1642, and an adder 1643.

The carrier phase shift amount calculator 1641 calculates a carrier phase shift amount $\theta cs$ on the basis of the rotation speed $\omega r$ and the torque command T*. The carrier phase shift amount $\theta cs$ is a phase difference between the three-phase voltage commands Vu*, Vv*, and Vw* for the inverter 3 and the triangular wave signal Tr which is a carrier wave used for pulse width modulation, and is set to a value by which meshing pulsation generated in the speed reducer 8 can be reduced.

Here, the carrier phase shift amount $\theta cs$ by which meshing pulsation generated in the speed reducer 8 can be reduced corresponds to a value of a modulated wave/carrier phase difference such that the electromagnetic excitation force or torque pulsation generated in the motor 2 by harmonic waves of the fundamental harmonic current and vibration generated due to meshing of the gears in the speed reducer 8 have phases opposite to each other as described above, and this is determined according to the rotation speed $\omega r$ and the torque command T*. Therefore, for example, for various combinations of the rotation speed $\omega r$ and the torque command T*, an optimum value of the carrier phase shift amount $\theta cs$ is determined in advance by actual measurement, simulation, or the like, and the value is tabulated and stored in the carrier phase shift amount calculator 1641. Then, when the current rotation speed $\omega r$ and the value of the torque command T* are input to the carrier phase shift amount calculator 1641, the value of the carrier phase shift amount $\theta cs$ corresponding to a combination thereof is read from the table and acquired. As a result, the carrier phase shift amount $\theta cs$ can be calculated on the basis of the rotation speed $\omega r$ and the torque command T*.

The reference voltage phase calculator 1642 calculates a reference voltage phase $\theta vb$ for fixing the phase of the carrier wave in synchronous PWM control on the basis of the synchronous PWM carrier number Nc, the voltage phase $\theta v$, and the carrier phase shift amount $\theta cs$ obtained by the carrier phase shift amount calculator 1641. By calculating the reference voltage phase $\theta vb$ by the reference voltage phase calculator 1642, the above-described desired relationship can be satisfied between the electromagnetic excitation force or torque pulsation generated in the motor 2 by harmonic waves of the fundamental harmonic current and vibration generated due to meshing of the gears in the speed reducer 8.

Figure 8:
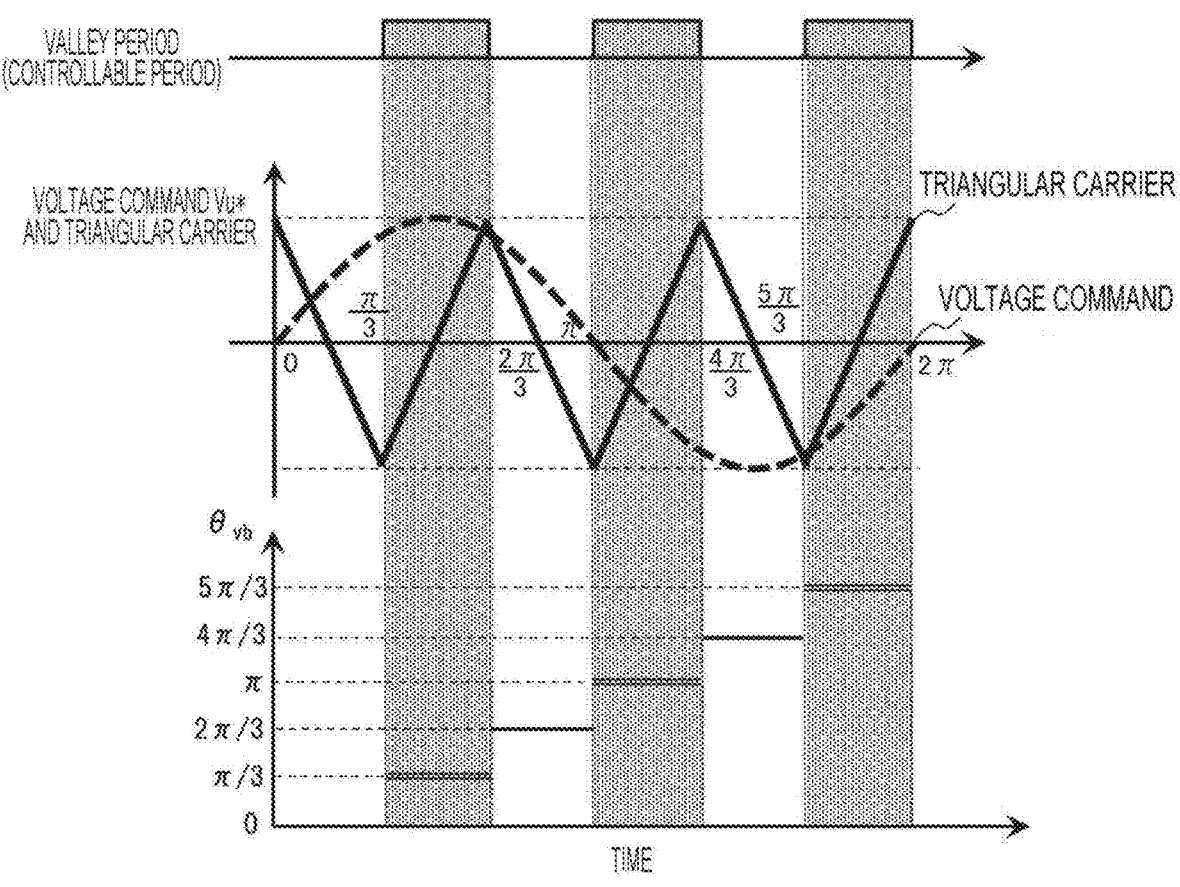
FIG. 8 is a conceptual diagram of reference voltage phase calculation of the present invention.

FIG. 8 is a conceptual diagram of reference voltage phase calculation performed by the reference voltage phase calculator 1642. For example, as illustrated in FIG. 8, the reference voltage phase calculator 1642 calculates a reference voltage phase $\theta vb$ that changes stepwise between 0 and $2\pi$ with the number of steps corresponding to the synchronous PWM carrier number Nc. In order to make the description easier to understand, FIG. 8 illustrates an example when the synchronous PWM carrier number Nc is 3.

In the present embodiment, in order to reduce a processing load, for example, as illustrated in FIG. 8, the carrier frequency adjuster 16 can adjust the frequency of the carrier wave only in a valley division period in which a triangular carrier wave rises from the minimum value (valley) to the maximum value (mount). In this case, the synchronous carrier frequency calculator 165 performs synchronous PWM control by sequentially calculating the synchronous carrier frequency fcs from the voltage phase error Δθv in the valley division period of the carrier wave. The reference voltage phase calculator 1642 calculates the reference voltage phase θvb used for calculation of the voltage phase error Δθv as a discrete value that changes at π/3 intervals as illustrated in FIG. 8. The interval between the reference voltage phases θvb changes according to the synchronous PWM carrier number Nc. As the synchronous PWM carrier number Nc increases, the interval between the reference voltage phases θvb decreases.

However, when the order of the meshing frequency of the speed reducer 8 is set to an odd number or a number including a decimal point value as described above, there are cases where the synchronous PWM carrier number Nc needs to be set to a number including a decimal point value in order for the values of Nc±3 and Nc×2 to match this order. In such a case, it is necessary to change the initial phase of the triangular carrier wave by changing the initial value of the reference voltage phase θvb for each voltage command cycle.

Specifically, the reference voltage phase calculator 1642 calculates the reference voltage phase θvb on the basis of the voltage phase θv, the synchronous PWM carrier number Nc, and the carrier phase shift amount θcs according to the following Formulas (6) to (7).

$$\theta vb = \mathrm{int}\ \big(\theta v/\theta s\big)\cdot\theta s + 0.5\ \theta s - 2\ \pi/Nc\cdot n\cdot Nd + \theta cs \qquad (6)$$

$$\theta s = 2\pi/Nc \qquad (7)$$

Here, θs represents a change width of the voltage phase θv per carrier wave, and int represents a rounding down operation after the decimal point. In addition, Nd represents a value of a fractional part of the synchronous PWM carrier number Nc, and n represents a count value that increases from 0 by 1 for each voltage command cycle.

In the present embodiment, the reference voltage phase calculator 1642 may calculate the reference voltage phase θvb by a calculation method other than Formulas (6) to (7) as long as the reference voltage phase θvb that changes stepwise between 0 and 2π with the number of steps according to the synchronous PWM carrier number Nc and has an initial value changing every voltage command cycle can be calculated based on the voltage phase θv.

The adder 1643 calculates the voltage phase error Δθv by adding the reference voltage phase θvb calculated by the reference voltage phase calculator 1642 to the voltage phase θv.

The voltage phase error calculator 164 calculates the voltage phase error Δθv as described above. As a result, the voltage phase error Δθv can be determined on the basis of the synchronous PWM carrier number Nc, the voltage phase θv, the rotational speed ωr, and the torque command T* such that pulsation due to meshing of the gears of the speed reducer 8 is offset by torque pulsation or the electromagnetic excitation force due to the carrier wave used in pulse width modulation. As a result, the carrier frequency fc can be set by changing the phase difference between the voltage command for the inverter 3 and the carrier wave used for pulse width modulation such that torque pulsation or electromagnetic excitation force generated in the motor drive system 100 is reduced.

Figure 9:
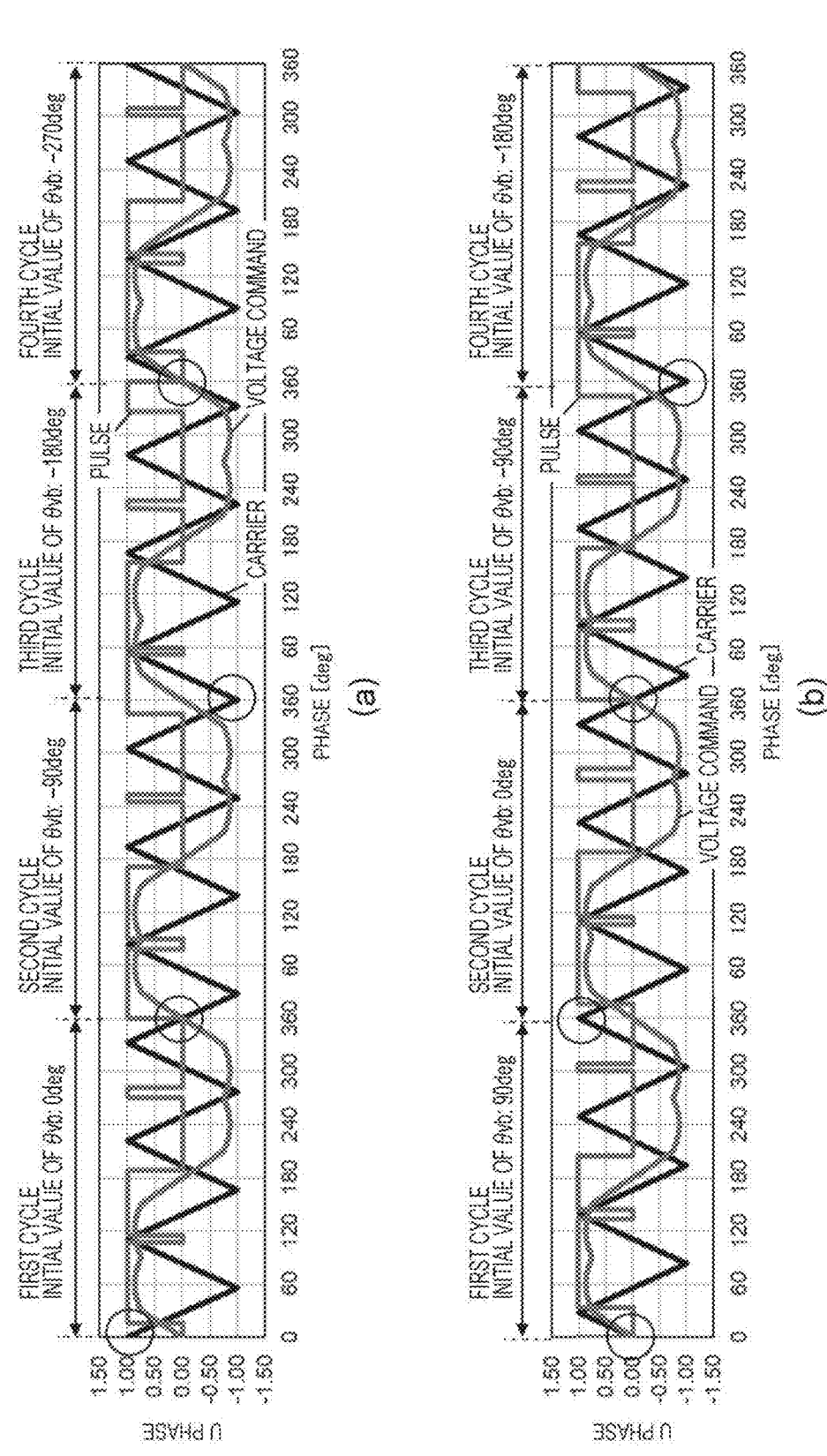
FIG. 9 is a diagram illustrating an example of a carrier wave, a voltage command, and a PWM pulse.

FIG. 9 is a diagram illustrating an example of a carrier wave (triangular wave signal Tr) and a voltage command in the motor control device 1 of the present embodiment, and PWM pulses generated by comparison between the carrier wave and the voltage command. FIG. 9(a) illustrates an example of each signal in a case of Nc=3.25 and θcs=0, and FIG. 9(b) illustrates an example of each signal in a case of Nc=3.25 and θcs=90 deg. In these examples, the value of Nd in the aforementioned Formulas (6) and (7) is Nd=0.25.

In both FIGS. 9(a) and 9(b), it can be ascertained that the initial phase of the triangular carrier wave Tr in each voltage command cycle changes by 2π×Nd=0.5π (90 deg) by changing the initial value of the reference voltage phase θvb for each voltage command cycle according to Formulas (6) and (7). That is, the frequency of the triangular wave signal Tr is adjusted such that the phase difference between the voltage command for the inverter 3 and the carrier wave used for pulse width modulation becomes the carrier phase shift amount θcs with the voltage command for 1/Nd=4 cycles as one set.

In the carrier frequency adjuster 16, the above processing may be performed either during power driving or regenerative driving of the motor 2. The torque command T* becomes a positive value during power driving, and the torque command T* becomes a negative value during regenerative driving. Therefore, the carrier frequency adjuster 16 determines power driving or regenerative driving of the motor 2 from the value of the torque command T*, and performs the above-described calculation processing in the voltage phase error calculator 164 on the basis of the determination result, and thus the carrier frequency fc can be set by changing the voltage phase error Δθv such that vibration generated in the speed reducer 8 is offset by the electromagnetic excitation force or torque pulsation according to the carrier wave used in pulse width modulation.

According to the first embodiment of the present invention described above, the following operational effects are achieved.

(1) The motor control device 1 is connected to the inverter 3 that performs power transform from DC power to AC power, controls driving of the motor 2 that outputs, via the speed reducer 8, a rotational driving force generated by driving using the AC power, and includes the triangular wave generator 17 that generates a triangular wave signal Tr that is a carrier wave, the carrier frequency adjuster 16 that adjusts a carrier frequency fc representing the frequency of the triangular wave signal Tr, and a gate signal generator 18 that performs pulse width modulation on three-phase voltage commands Vu*, Vv*, and Vw* according to a torque command T* using the triangular wave signal Tr and generates a gate signal for controlling the operation of the inverter 3. The carrier frequency adjuster 16 changes phase differences between the three-phase voltage commands Vu*, Vv*, and Vw* and the triangular wave signal Tr on the basis of the torque command T* and the rotational speed ωr of the motor 2, and adjusts the carrier frequency fc such that the difference between the meshing frequency of the speed reducer 8 and a harmonic component of the fundamental harmonic current according to the three-phase voltage commands Vu*, Vv*, and Vw* falls within a predetermined range. With this configuration, it is possible to effectively suppress vibration and noise generated in a case where the motor 2 and the speed reducer 8 have been combined.

(2) The carrier frequency adjuster 16 adjusts the carrier frequency fc such that the synchronous PWM carrier number Nc representing the magnification of the carrier frequency fc with respect to the frequencies of the three-phase voltage commands Vu*, Vv*, and Vw* becomes a constant number. With this configuration, it is possible to adjust the voltage waveforms of the three-phase voltage commands Vu*, Vv*, and Vw* such that the cycle and the phase of the triangular wave signal Tr, which is a carrier wave, have a desired relationship, and to reliably perform synchronous PWM control.

(3) In a case where the synchronous PWM carrier number Nc is a constant number including an integer part Ni and a decimal part Nd, the carrier frequency adjuster 16 changes the phase differences between the three-phase voltage commands Vu*, Vv*, and Vw* and the triangular wave signal Tr by shifting the initial phase of the triangular wave signal Tr by $2\pi \times Nd$ every cycle of the three-phase voltage commands Vu*, Vv*, and Vw* by calculating the reference voltage phase θvb using Formulas (6) and (7). In this way, even in a case where the order of the meshing frequency of the speed reducer 8 is set to an odd number or a number including a decimal point value, the cycle and the phase of the triangular wave signal Tr, which is a carrier wave, are adjusted to have a desired relationship, and vibration and noise generated in a case where the motor 2 and the speed reducer 8 have been combined can be effectively suppressed.

Second Embodiment

Next, a second embodiment of the present invention will be described with reference to the drawings.

Figure 10:
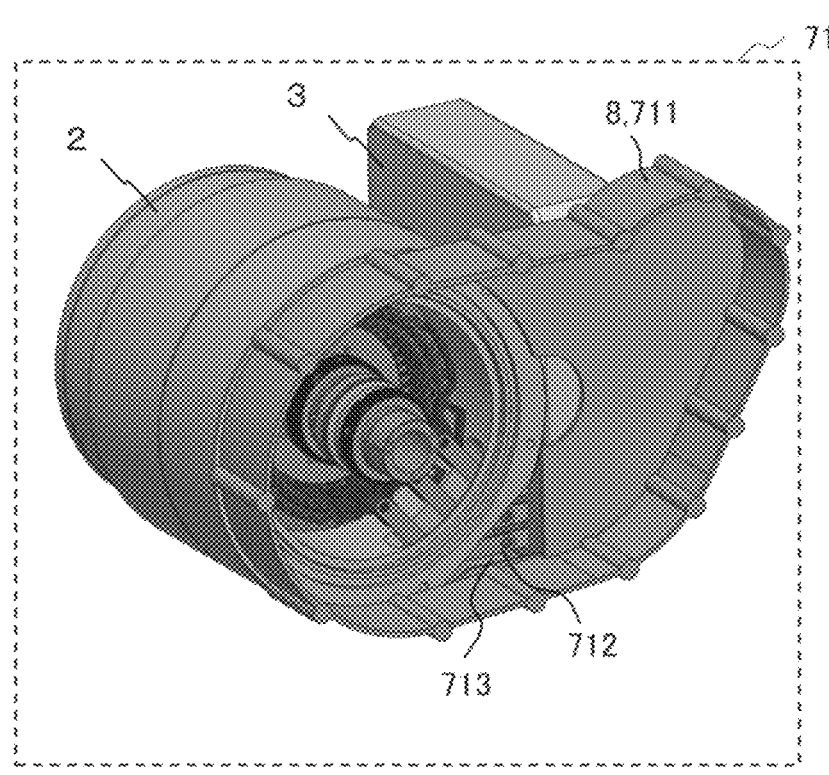
FIG. 10 is an external perspective view of an electromechanical integrated unit in a second embodiment of the present invention.

FIG. 10 is an external perspective view of an electromechanical integrated unit 71 in the second embodiment.

The electromechanical integrated unit 71 includes the motor drive system 100 (motor control device 1, motor 2, inverter 3, and speed reducer 8) described in the first embodiment. The motor 2 and the inverter 3 are connected by a coupling part 713 via a bus bar 712. The output of the motor 2 is transmitted to a differential gear which is not illustrated via a gear 711 included in the speed reducer 8, and is transmitted to an axle. Although the motor control device 1 is not illustrated in FIG. 10, the motor control device 1 can be disposed at an arbitrary position.

A feature of the electromechanical integrated unit 71 is a structure in which the motor 2, the inverter 3, and the speed reducer 8 including the gear 711 are integrated. In the electromechanical integrated unit 71, due to such an integrated structure, resonance may occur between vibration and noise caused by time harmonic generated in the motor 2 and vibration and noise caused by meshing of the gear 711 in the speed reducer 8, and in this case, the vibration and noise are deteriorated. However, by controlling driving of the motor 2 using the motor control device 1 described in the first embodiment, these can be offset and suppressed, and thus an electromechanical integrated unit with low vibration and low noise can be realized.

Third Embodiment

Next, a third embodiment of the present invention will be described with reference to the drawings.

Figure 11:
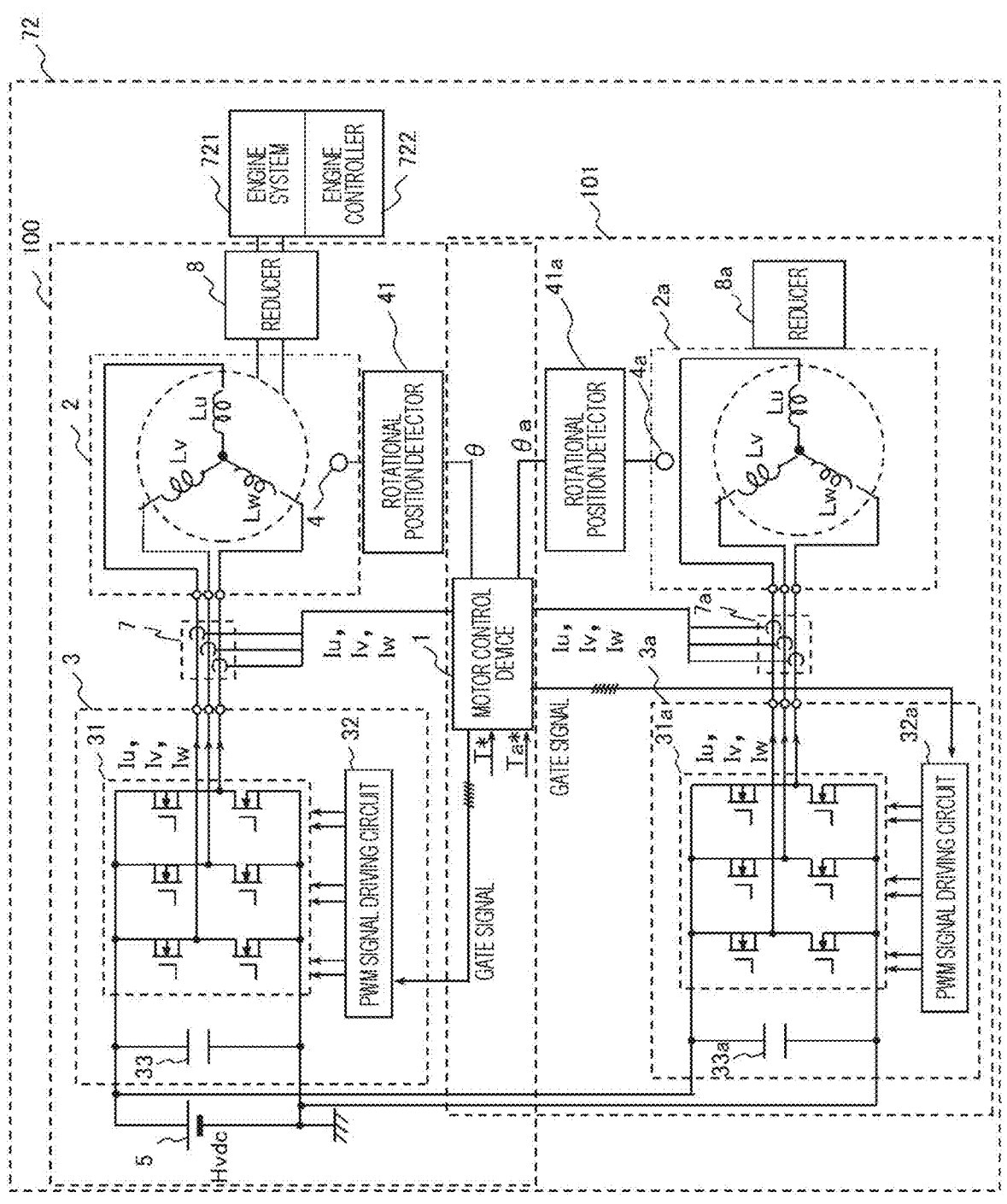
FIG. 11 is a configuration diagram of a hybrid system in a third embodiment of the present invention.

FIG. 11 is a configuration diagram of a hybrid system 72 in the third embodiment.

As illustrated in FIG. 11, the hybrid system 72 includes the motor drive system 100 (motor control device 1, motor 2, inverter 3, high-voltage battery 5, current detection unit 7, speed reducer 8, and rotational position detector 41) described in the first embodiment and a motor drive system 101 (motor control device 1, motor 2a, inverter 3a, high-voltage battery 5, current detection unit 7a, speed reducer 8a, and rotational position detector 41a) similar thereto. The motor drive systems 100 and 101 share the motor control device 1 and the high-voltage battery 5.

A rotational position sensor 4a for detecting the rotational position θa of the rotor is attached to the motor 2a. The rotational position detector 41a calculates the rotational position θa from an input signal of the rotational position sensor 4a and outputs the rotational position da to the motor control device 1. The current detection unit 7a is disposed between the inverter 3a and the motor 2a. The speed reducer 8a formed by connecting a plurality of gears is attached to the rotation shaft of the motor 2a. A torque generated in the rotor of the motor 2a is transmitted from a rotation shaft fixed to the rotor to the outside of the motor drive system 101 via the speed reducer 8a.

The inverter 3a includes an inverter circuit 31a, a PWM signal driving circuit 32a, and a smoothing capacitor 33a. The PWM signal driving circuit 32a is connected to the motor control device 1 common to the PWM signal driving circuit 32 of the inverter 3, generates a PWM signal for controlling each switching element of the inverter circuit 31a on the basis of a gate signal input from the motor control device 1, and outputs the PWM signal to the inverter circuit 31a. The inverter circuit 31a and the smoothing capacitor 33a are connected to the high-voltage battery 5 common to the inverter circuit 31 and the smoothing capacitor 33.

A torque command T* for the motor 2 and a torque command Ta* for the motor 2a are input to the motor control device 1. The motor control device 1 generates gate signals for controlling driving of the motors 2 and 2a through the method described in the first embodiment on the basis of these torque commands, and outputs the gate signals to the inverters 3 and 3a. That is, the voltage phase error calculator 164 of the carrier frequency adjuster 16 included in the motor control device 1 calculates the voltage phase error Δθv to adjust the frequency of the triangular wave signal Tr, which is a carrier wave, such that vibration and noise generated in the motor drive systems 100 and 101 configured by combining the motors 2 and 2a and the speed reducers 8 and 8a can be suppressed. In the voltage phase error calculator 164, the carrier phase shift amount calculator 1641 may set a different carrier phase shift amount θcs for each of the inverters 3 and 3a.

An engine system 721 and an engine controller 722 are connected to the motor 2. The engine system 721 is driven under the control of the engine controller 722 to rotationally drive the motor 2. The motor 2 is rotationally driven by the engine system 721 to operate as a generator and generate AC power. The AC power generated by the motor 2 is transformed into DC power by the inverter 3 and charged in the high-voltage battery 5. As a result, the hybrid system 72 can be caused to serve as a series hybrid system. The engine system 721 and the engine controller 722 may be connectable to the motor 2a.

According to the present embodiment, by realizing the hybrid system 72 of FIG. 11 using the motor control device 1 described in the first embodiment, it is possible to obtain an effect of reducing vibration and noise generated in a case where the motors 2 and 2a and the speed reducers 8 and 8a have been combined. Therefore, it is possible to reduce a damping material, a sound absorbing material, and the like which are necessary for vibration/noise countermeasures in conventional hybrid systems.

Fourth Embodiment

Next, a fourth embodiment of the present invention will be described with reference to the drawings. In the present embodiment, an example of application to an electric power steering system will be described.

Figure 12:
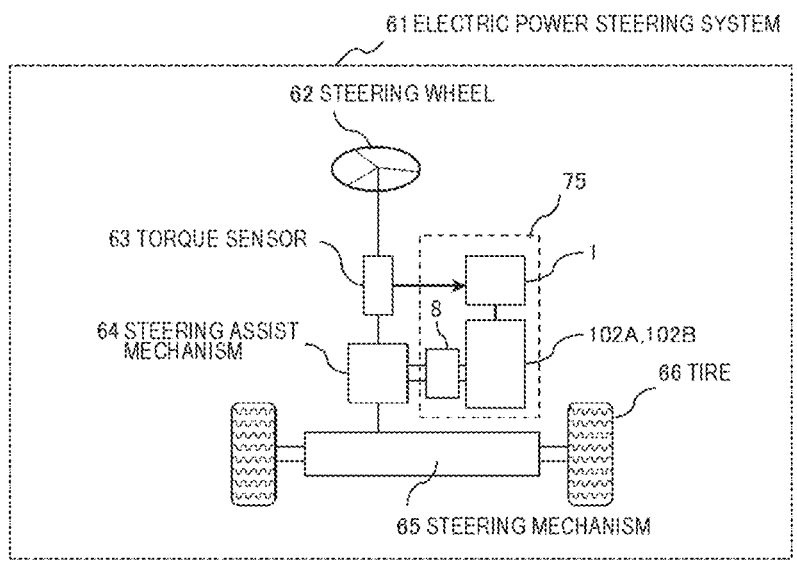
FIG. 12 is a configuration diagram of an electric power steering system in a fourth embodiment of the present invention.

FIG. 12 is a configuration diagram of an electric power steering system in the fourth embodiment of the present invention. The electric power steering system 61 includes a drive control system 75 including the motor control device 1 and the speed reducer 8 described in the first embodiment, and redundant drive systems 102A and 102B. The electric power steering system 61 detects a rotational torque of a steering wheel 62 by a torque sensor 63 and operates the drive control system 75 on the basis of the rotational torque. As a result, an assist torque according to input of the steering wheel 62 is generated using the rotational driving force of the motor 2 included in the drive control system 75, and is output to a steering mechanism 65 via the speed reducer 8 and a steering assist mechanism 64, thereby assisting a steering operation of a driver. As a result, a tire 66 is steered by the steering mechanism 65, and a traveling direction of a vehicle is controlled.

In general, since an electric power steering system of a vehicle is directly connected to a driver via a steering wheel, vibration and noise are easily transmitted to the driver, and thus required specifications for vibration and noise are high. In particular, in a state in which the driver rotates the steering wheel at a high speed, the operation of the motor or the speed reducer becomes dominant as a cause of vibration or noise as compared with other generation factors. On the other hand, the electric power steering system 61 of the present embodiment can effectively reduce vibration in a state in which the driver rotates the steering wheel 62 at a high speed, and thus can realize an electric power steering system with low vibration and low noise.

Figure 13:
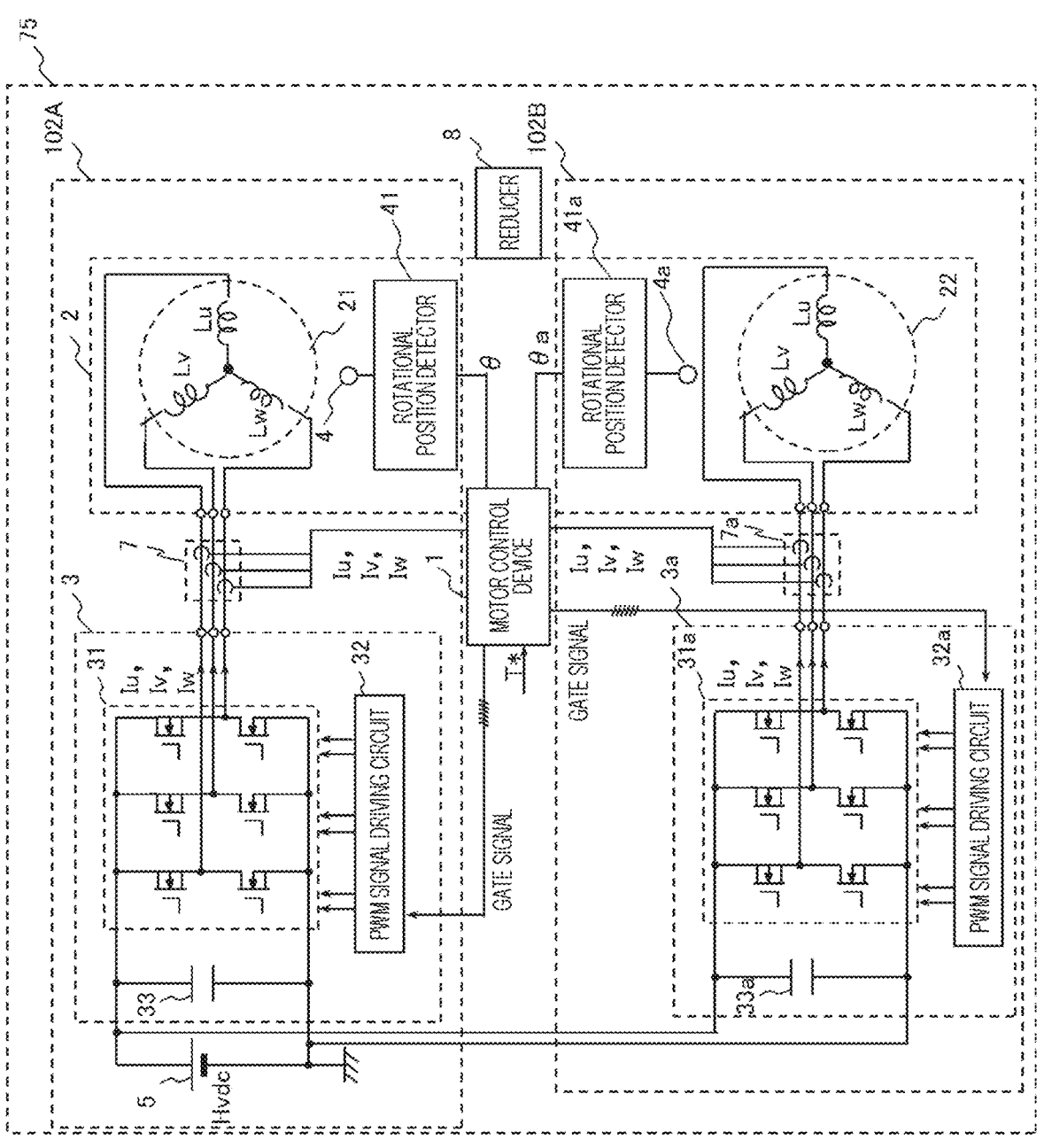
FIG. 13 is a configuration diagram of a drive control system in an electric power steering system according to a fourth embodiment of the present invention.

FIG. 13 is a diagram illustrating a configuration of the drive control system 75 in the electric power steering system 61 according to the fourth embodiment of the present invention. In the drive control system 75, the motor control device 1, the motor 2, the high-voltage battery 5, and the speed reducer 8 are commonly connected to the redundant drive systems 102A and 102B. In the present embodiment, the motor 2 includes two winding systems 21 and 22, one winding system 21 constitutes the drive system 102A, and the other winding system 22 constitutes the drive system 102B.

The drive system 102A includes an inverter 3 and a rotational position detector 41, and a rotational position sensor 4 for detecting a rotational position θ of a rotor corresponding to the winding system 21 is attached to the motor 2. AC power generated by the inverter 3 flows to the winding system 21 of the motor 2 to rotationally drive the motor 2. In the drive system 102A, the current detection unit 7 is disposed between the inverter 3 and the motor 2.

The drive system 102B includes an inverter 3a and a rotational position detector 41a, and a rotational position sensor 4a for detecting a rotational position θa of a rotor corresponding to the winding system 22 is attached to the motor 2. AC power generated by the inverter 3a flows to the winding system 22 of the motor 2 to rotationally drive the motor 2. In the drive system 102B, a current detection unit 7a is disposed between the inverter 3a and the motor 2. The inverter 3a, the rotational position detector 41a, the rotational position sensor 4a, and the current detection unit 7a are similar to those in FIG. 11 described in the third embodiment.

A torque command T* for the motor 2 is input to the motor control device 1. The motor control device 1 generates a gate signal for controlling driving of the motor 2 by the method described in the first embodiment on the basis of the input torque command T*, and outputs the gate signal to each of the inverters 3 and 3a. That is, the voltage phase error calculator 164 of the carrier frequency adjuster 16 included in the motor control device 1 calculates a voltage phase error Δθv to adjust the frequency of the triangular wave signal Tr, which is a carrier wave such that vibration and noise generated between the drive systems 102A and 102B and the speed reducer 8 can be suppressed. In the voltage phase error calculator 164, the carrier phase shift amount calculator 1641 may set different carrier phase shift amounts θcs for the inverters 3 and 3a.

According to the present embodiment, the electric power steering system 61 of FIG. 12 is realized using the motor control device 1 described in the first embodiment, and thus it is possible to obtain an effect of reducing vibration and noise generated in a case where the motor 2 and the speed reducer 8 have been combined. Therefore, an electric power steering system with low vibration and low noise can be realized.

In each of the embodiments described above, each configuration (FIGS. 2, 5, 7, and the like) in the motor control device 1 may realize the function of each component by a CPU and a program regardless of configuration by hardware. In a case where each configuration in the motor control device 1 is realized by the CPU and the program, there is an advantage that the cost can be reduced because the number of pieces of hardware is reduced. In addition, the program can be provided by being stored in advance in a storage medium of the motor control device. Alternatively, the program may be stored and provided in an independent storage medium, or the program may be recorded and stored in a storage medium of the motor control device via a network line. Various forms of computer-readable computer program products, such as data signals (carrier waves), may be provided.

The present invention is not limited to the above embodiments, and other forms conceivable within the scope of the technical idea of the present invention are also included within the scope of the present invention as long as the features of the present invention are not impaired. In addition, a configuration in which the plurality of embodiments described above are combined may be adopted.

REFERENCE SIGNS LIST

1 motor control device
2 motor
3 inverter
4 rotational position sensor
5 high-voltage battery
7 current detection unit
8 speed reducer
11 current command generator 12 speed calculator
13 three-phase/dq transformer
14 current controller
15 dq/three-phase voltage transformer
16 carrier frequency adjuster
17 triangular wave generator
18 gate signal generator
31 inverter circuit
32 PWM signal driving circuit
33 smoothing capacitor
41 rotational position detector
61 electric power steering system
71 electromechanical integrated unit
72 hybrid system
75 drive control system
100, 101 motor drive system
102A, 102B drive system
161 synchronous PMM carrier number selector
162 voltage phase calculator
164 voltage phase error calculator
165 synchronous carrier frequency calculator
166 carrier frequency setting unit
1641 carrier phase shift amount calculator
1642 reference voltage phase calculator
1643 adder

The invention claimed is:

1. A motor control device that controls driving of an AC motor that is connected to a power transformer that performs power transform from DC power to AC power and outputs a rotational driving force generated by driving using the AC power via a speed reducer, the motor control device comprising:

a carrier generator that generates a carrier wave;
a carrier frequency adjuster that adjusts a frequency of the carrier wave; and
a gate signal generator that performs pulse width modulation on a voltage command according to a torque command using the carrier wave and generates a gate signal for controlling an operation of the power transformer, wherein the carrier frequency adjuster changes a phase difference between the voltage command and the carrier wave based on the torque command and a rotational speed of the AC motor, and adjusts the frequency of the carrier wave such that a difference between a meshing frequency of the speed reducer and a harmonic component of a fundamental harmonic current according to the voltage command falls within a predetermined range.

2. The motor control device according to claim 1, wherein the carrier frequency adjuster adjusts the frequency of the carrier wave such that a magnification of the frequency of the carrier wave with respect to a frequency of the voltage command becomes a constant number.

3. The motor control device according to claim 2, wherein the magnification is a constant number including an integer part Ni and a decimal part Nd, and the carrier frequency adjuster shifts an initial phase of the carrier wave by $2\pi \times Nd$ every cycle of the voltage command to change a phase difference between the voltage command and the carrier wave.

4. An electromechanical integrated unit comprising:
the motor control device according to claim 1;
the power transformer connected to the motor control device;
the AC motor driven by the power transformer; and
the speed reducer that transmits the rotational driving force of the AC motor,
wherein the AC motor, the power transformer, and the speed reducer have an integrated structure.

5. A hybrid system comprising:
the motor control device according to claim 1;
the power transformer connected to the motor control device;
the AC motor driven by the power transformer;
the speed reducer that transmits the rotational driving force of the AC motor; and
an engine system connected to the AC motor.

6. An electric power steering system comprising:
the motor control device according to claim 1;
the power transformer connected to the motor control device;
the AC motor driven by the power transformer; and
the speed reducer that transmits the rotational driving force of the AC motor,
wherein a steering operation of a driver is assisted using the rotational driving force of the AC motor.

7. A motor control method of controlling driving of an AC motor that is connected to a power transformer that performs power transform from DC power to AC power and outputs a rotational driving force generated by driving using the AC power via a speed reducer, the method comprising:

generating a voltage command according to a torque command;
changing a phase difference between the voltage command and a carrier wave based on the torque command and a rotational speed of the AC motor, and adjusting a frequency of the carrier wave such that a difference between a meshing frequency of the speed reducer and a harmonic component of a fundamental harmonic current according to the voltage command falls within a predetermined range;
generating the carrier wave at the adjusted frequency; and
performing pulse width modulation on the voltage command using the carrier wave and generating a gate signal for controlling an operation of the power transformer.

*    *    *    *    *